United States Patent
Inoue et al.

(10) Patent No.: US 10,323,714 B2
(45) Date of Patent: Jun. 18, 2019

(54) DAMPER WITH INTEGRATED CENTRIFUGAL PENDULUM-TYPE VIBRATION ABSORBING DEVICE

(71) Applicant: VALEO UNISIA TRANSMISSIONS K. K., Kanagawa (JP)

(72) Inventors: Atsushi Inoue, Kanagawa (JP); Yoshiaki Mizuta, Kanagawa (JP)

(73) Assignee: Valeo Unisia Transmissions K. K., Kanagawa (JP)

( * ) Notice: Subject to any disclaimer, the term of this patent is extended or adjusted under 35 U.S.C. 154(b) by 0 days.

(21) Appl. No.: 15/316,343

(22) PCT Filed: Jun. 4, 2015

(86) PCT No.: PCT/JP2015/066162
§ 371 (c)(1),
(2) Date: Jan. 9, 2017

(87) PCT Pub. No.: WO2015/186777
PCT Pub. Date: Dec. 10, 2015

(65) Prior Publication Data
US 2017/0138435 A1  May 18, 2017

(30) Foreign Application Priority Data
Jun. 5, 2014  (JP) .................................. 2014-116536

(51) Int. Cl.
*F16F 15/10* (2006.01)
*F16F 15/134* (2006.01)
(Continued)

(52) U.S. Cl.
CPC ...... *F16F 15/134* (2013.01); *F16F 15/13142* (2013.01); *F16H 41/24* (2013.01); *F16H 45/02* (2013.01); *F16H 2045/0263* (2013.01)

(58) Field of Classification Search
CPC .. F16F 15/134; F16F 15/12353; F16F 15/145; F16D 3/12; F16H 2045/0263
See application file for complete search history.

(56) References Cited

U.S. PATENT DOCUMENTS 8,161,739 B2   4/2012  Degler et al.
9,163,712 B2 * 10/2015  Gerdeman .............. F16H 45/02
(Continued)

FOREIGN PATENT DOCUMENTS

EP   2600030 A2   6/2013
EP   2853771 A1   4/2015
(Continued)

*Primary Examiner* — Thomas C Diaz
(74) *Attorney, Agent, or Firm* — Berenato & White, LLC (57) ABSTRACT

A damper with an integrated centrifugal pendulum-type vibration absorbing device is equipped with a drive plate for transmitting engine torque to a transmission. The drive plate has a stepped shape toward the annular outer edge. An annular side plate makes sliding contact with the outermost edge of the drive plate. An annular hub clutch is held between the side plate and the inside annular portion of the drive plate. Multiple torsion springs are arranged such that at least one end makes sliding contact with the hub clutch. A back plate grips the sides of the torsion springs, and is connected to the drive plate. Centrifugal pendulum-type vibration absorbing devices are mounted on a disc-shaped and circular back plate. Centrifugal pendulum-type vibration absorbing devices are mounted on the outer circumferential side of the back plate.

6 Claims, 6 Drawing Sheets

(51) Int. Cl.
*F16H 41/24* (2006.01)
*F16H 45/02* (2006.01)
*F16F 15/131* (2006.01)

(56) References Cited

U.S. PATENT DOCUMENTS

| | | |
|---|---|---|
| 9,683,626 B2 * | 6/2017 | Verhoog ........... F16F 15/12373 |
| 2014/0041479 A1 | 2/2014 | Dinger |
| 2014/0194213 A1 | 7/2014 | Verhoog et al. |

FOREIGN PATENT DOCUMENTS

| | | | |
|---|---|---|---|
| JP | 2011504986 A | 2/2011 | |
| JP | 5387562 B2 | 1/2014 | |
| WO | WO-2012172225 A1 * | 12/2012 | ........ F16F 15/12373 |
| WO | WO2012172225 A1 | 12/2012 | |
| WO | WO2013121123 A1 | 8/2013 | |

* cited by examiner

DAMPER WITH INTEGRATED CENTRIFUGAL PENDULUM-TYPE VIBRATION ABSORBING DEVICE

CROSS-REFERENCE TO RELATED APPLICATIONS AND CLAIM TO PRIORITY

This application is a national stage application of International Application No. PCT/JP2015/066162 filed Jun. 4, 2015, which claims priority to Japanese Patent Application No. 20140116536 filed Jun. 5, 2014, the disclosures of which are incorporated herein by reference and to which priority is claimed.

FIELD OF THE INVENTION

The present invention concerns technology relating to a lock-up device in a hydraulic transmission system (what is known as a "torque converter") interposed between an input shaft of a transmission and a crankshaft of an engine, for example, and in particular the present invention relates to a vibration absorbing device (damper).

BACKGROUND OF THE INVENTION

A torque converter incorporated into a vehicle automatic transmission is constructed in such a way that a front cover forming a front surface portion of a converter housing is driven in rotation by a crankshaft, torque is transmitted between blades on a pump impeller side of the converter housing and blades on a turbine runner side, and the torque is transmitted from an output shaft driven by the turbine runner to an input shaft of a transmission. In addition, the torque converter has a lock-up device for directly transmitting the torque of the engine crankshaft to the transmission in order to improve fuel consumption.

In the lock-up device, the output shaft and the front cover of the converter housing are connected by a clutch which is driven by fluid pressure (hydraulic pressure), and the torque of the engine crankshaft is transmitted directly to the input shaft of the transmission.

A torque conversion unit formed by the pump impeller and the turbine runner etc., and the lock-up device formed by a lock-up piston, an input-side rotation member, an output-side rotation member and a buffer etc. are attached by fastening (riveting) of a turbine hub and the output-side rotation member (hub clutch).

This kind of lock-up device comprises a torsional vibration reduction mechanism (also referred to below as a "damper") interposed between the clutch and the output shaft in order to absorb and damp torsional vibration.

What is known as a damper constituting the torsional vibration absorbing mechanism is constructed here as the buffer. The damper absorbs torsional vibration produced from rotational torque when rotational torque from the input-side rotation member is transmitted to the output-side rotation member, and transmits this from the turbine hub to the output-side rotation member. The structure of the damper is an integrated structure in which a drive plate and a side plate are fixed by riveting, and the rotational force thereof is transmitted to the turbine hub via the hub clutch. The arrangement is such that torsion springs for absorbing torsional vibration are then interposed between the drive plate and the side plate, and torsional vibration is absorbed when torque is transmitted to the hub clutch.

These members are substantially disk-shaped and rotate about the crankshaft, and a number of torsion springs interposed between the drive plate and the side plate are generally disposed equally on the rotational circumference thereof. The torsion springs for limiting torsional vibration are generally constructed as an elastic vibration reducing mechanism in view of the structure thereof, and demonstrate their function by using spring resilience to damp pressure resulting from contact of the hub clutch, which is a physical external force.

A centrifugal pendulum-type vibration absorbing device has a substantially disk-shaped structure in which a pendulum member that can freely move in the radial direction in the manner of a pendulum is disposed in the vicinity of substantially the outer circumferential side and the radial side with respect to an axis of rotation. A plurality of pendulum members are disposed at fixed intervals along the circumference of a plate formed as a single piece with the centrifugal pendulum-type vibration absorbing device, and the individual weights thereof are also set in accordance with the centrifugal pendulum function.

The pendulum members are subjected to centrifugal force as a result of rapid rotation of the centrifugal pendulum-type vibration absorbing device and move to the outer circumference, so the mass balance of the centrifugal pendulum-type vibration absorbing device as a whole moves in the outer circumferential direction, and a function of damping a rapid rotational speed is demonstrated. Furthermore, changes in the mass balance of the centrifugal pendulum-type vibration absorbing device as a whole produced by any free movement having an inertia force of the centrifugal pendulum with respect to torsional vibration and rotational vibration act as a force to damp rotational movement.

As indicated above, the torsional vibration absorbing function afforded by the elastic vibration reducing mechanism of the damper, and the pendulum-type vibration damping mechanism afforded by the centrifugal pendulum-type vibration absorbing device constitute the same vibration buffering function, but the actions thereof are different. A vibration absorbing mechanism combining both the functions of the elastic vibration reducing mechanism and the pendulum-type vibration damping mechanism has therefore come to be used as a vibration absorbing mechanism within a torque converter incorporated in a vehicle automatic transmission. Various technologies have been investigated for mechanisms for imparting a centrifugal pendulum-type vibration absorbing function within a conventional torque converter damper structure.

For example, JP 5387562B2 describes a technical concept indicating the structure of a substantially circular centrifugal pendulum-type vibration absorbing device comprising centrifugal pendulum-type vibration absorbing bodies. These vibration absorbing bodies demonstrate a function of controlling vibration in the radial direction with respect to an axis of rotation, while controlling impacts between adjacent masses and the generation of abnormal noise caused thereby.

However, although that example gives a detailed description of the centrifugal pendulum-type vibration absorbing bodies, there is no mention of the specific structure installed in the torque converter or the advantage thereof, so the technical and economic benefits resulting from installation of the centrifugal pendulum-type vibration absorbing bodies are unclear.

JP 2011-504986 A describes a technical concept relating to a centrifugal pendulum-type dynamic damper for reducing torsional vibration produced in a rotary shaft. That dynamic damper has a structure in which a rotary plate, provided as a single piece with a rotary shaft, and centrifugal pendulum-type vibration absorbing bodies are housed in a plurality of housing compartments formed at fixed intervals in the circumferential direction of a rotary plate. The rotary plate comprises a hub which is attached to a crankshaft and rotates as a single piece with said crankshaft. The centrifugal pendulum-type vibration absorbing bodies are constructed in such a way as to reduce torsional vibration generated as the crankshaft rotates by moving back and forth while rolling inside the housing compartments.

However, although that example gives a description of the technical advantage of installing the centrifugal pendulum-type vibration absorbing bodies inside a torque converter, there is no mention of the specific installation structure and thus there is no description of the technical benefit, contribution to facilitating production, and economic advantage etc. resulting from a specific form of structure in which the centrifugal pendulum-type vibration absorbing bodies are installed as a single piece with a damper.

SUMMARY OF THE INVENTION

As indicated above, the torsional vibration absorbing function afforded by the elastic vibration reducing mechanism serving as a damper, and the pendulum-type vibration damping mechanism afforded by the centrifugal pendulum-type vibration absorbing device may be provided together as the same vibration buffering function, but the actions thereof are different nonetheless. A vibration absorbing mechanism combining both the functions of the elastic vibration reducing mechanism and the pendulum-type vibration damping mechanism has therefore come to be used as a vibration absorbing mechanism within a torque converter incorporated in a vehicle automatic transmission, but there are still unresolved problems in terms of setting optimum conditions for the combination of both functions of the elastic vibration reducing mechanism and the pendulum-type vibration damping mechanism while achieving a balance between both vibration absorbing functions, and reducing the weight of the torque converter device as a whole in order to make savings in terms of the constituent members. Furthermore, the ability to employ a simplified structure which is easy to assemble and the manner in which space can be saved are also important issues for reducing costs in the production and assembly processes.

The present invention is intended to solve the abovementioned problems of the prior art as described above, and the problem addressed by the present invention lies in providing a means for developing a vibration absorbing mechanism in a torque converter, which is able to adequately demonstrate both functions of an elastic vibration reducing mechanism and a pendulum-type vibration damping mechanism, while ease of assembly is improved with a small number of components and reduced weight. A further problem addressed by the present invention lies in providing a damper with an integrated centrifugal pendulum-type vibration absorbing device which especially improves economic efficiency while particularly improving safety and ease of operation of a main body.

In order to solve the abovementioned problem, the damper with an integrated centrifugal pendulum-type vibration absorbing device according to the present invention has the feature of comprising: a drive plate formed with a stepped shape toward a substantially annular outer edge, for transmitting engine torque to a transmission; a substantially annular side plate in sliding contact with an outermost edge portion of the drive plate; a substantially annular hub clutch held between the side plate and a relatively inside annular portion of the drive plate; a plurality of torsion springs which partially form arcs in a space maintained between the side plate and the relatively inside annular portion of the drive plate, and are arranged in such a way that at least one end thereof is in sliding contact with the hub clutch; a back plate which grips the side surfaces of the plurality of torsion springs and is connected to the drive plate in such a way as to be removable from the outside of the drive plate in a rotational axis direction; a substantially disk-shaped and substantially annular back plate in which a centrifugal pendulum-type vibration absorbing device is mounted on an outer circumferential side; and a centrifugal pendulum-type vibration absorbing device which is mounted on an outer circumferential surface of said back plate.

The damper with an integrated centrifugal pendulum-type vibration absorbing device according to the present invention has a structure in which a centrifugal pendulum-type vibration absorbing body is held on the outside of the circumferential radius of a conventional back plate, and therefore the actual back plate forms a centrifugal pendulum-type vibration absorbing device. That is to say, the back plate demonstrates the function of a centrifugal pendulum-type vibration absorbing device. A new member serving as a centrifugal pendulum-type vibration absorbing device is therefore not required for the assembly process and a reduction in weight and a simplification of assembly can be envisaged.

A feature of the damper with an integrated centrifugal pendulum-type vibration absorbing device according to the present invention also lies in the fact that the centrifugal pendulum-type vibration absorbing device has a structure which is removable from one side of a power transmission device in the rotational axis direction thereof, said structure being fixed by a plurality of rivets at substantially equal angular positions about the axis of rotation.

The back plate is positioned at the outermost side in a rotational axis direction with respect to a substantially disk-shaped drive plate from a substantially annular hub clutch positioned substantially in the center of the damper, and is therefore incorporated at the final process of damper assembly. This improves the ease of operation and may also considerably simplify removal. This likewise also contributes to simplifying assembly of the torsion springs. The torsion springs can also be assembled without coming loose during the assembly process and bending can also be prevented.

For example, when the mounting operation employs riveting to the drive plate, it is possible to remove the back plate constituting the centrifugal pendulum-type vibration absorbing device together with the drive plate simply by removal of the rivets. It is therefore also possible to mount a separate back plate likewise in a simple manner. This makes it possible to freely remove the centrifugal pendulum-type vibration absorbing device and also to freely replace and mount a centrifugal pendulum-type vibration absorbing device having a different specification.

The damper with an integrated centrifugal pendulum-type vibration absorbing device according to the present invention is provided with a cover portion (torsion spring holding surface) for holding the torsion springs on a radial side surface of the back plate so that the torsion springs fixed to an opening in the drive plate are held and fixed from the spring circumferential side surface and therefore the performance in terms of holding the torsion springs is considerably improved. This also reduces the space occupied in the rotational axis direction. The torsion springs move by a relatively small amount and the durability thereof is therefore increased and this also produces a hysteresis reduction effect. It is also possible to achieve the same effect as with simplifying removal of the back plate in terms of facilitating removal and assembly of the torsion springs.

The process of assembling the back plate by means of riveting during the production process can therefore be carried out in a common manner in terms of rivet positioning, attachment direction, fastening process and the number of attachments, even if members having different specifications are used to achieve the centrifugal pendulum-type vibration absorbing function of the back plate. This makes it possible to achieve constant assembly time and assembly work, thereby enabling a considerable reduction in production costs.

The centrifugal pendulum-type vibration absorbing body has the function of absorbing vibration at different wavelengths to torsional vibration produced in a conventional damper. Although the structure serves to control and prevent unnecessary vibration when input-side rotational drive from any engine is converted on the output side, it is possible to add a vibration controlling function in areas having different vibration frequencies by adding the centrifugal pendulum-type vibration absorbing device to a damper function ensuring that engine vibration during changes in engine rotation speed is not transmitted to the output side from the crankshaft. In order to demonstrate the effect of preventing vibration at a specific frequency by selecting that vibration frequency, there is a very strong technical benefit in being able to freely select various functions and being able to match specific functions by combining a torsional vibration reducing mechanism and a centrifugal force vibration reducing mechanism in a damper.

A feature of the damper with an integrated centrifugal pendulum-type vibration absorbing device according to the present invention lies in the fact that the weight of the drive plate is reduced in order to increase the ratio of vibration absorbing capacity afforded by the centrifugal pendulum-type vibration absorbing function with respect to a function for absorbing primary inertial vibration from the inertia force of a damper mass and a function for absorbing elastic vibration for damping torsional vibration afforded by torsion spring resilience. A further feature of the damper with an integrated centrifugal pendulum-type vibration absorbing device lies in the fact that the drive plate and the centrifugal pendulum-type vibration absorbing device are operated in a multifunctional shared manner in order to enable free setting of the ratio of vibration absorbing capacity afforded by the centrifugal pendulum-type vibration absorbing function with respect to a function for absorbing primary inertial vibration from the inertia force of a damper mass and a function for absorbing elastic vibration for damping torsional vibration afforded by torsion spring resilience.

The damper with an integrated centrifugal pendulum-type vibration absorbing device according to the present invention makes it possible to vary the centrifugal pendulum-type vibration absorbing function and the total weight of the drive plate etc. by changing the number and specification of centrifugal pendulum-type vibration absorbing bodies mounted on the drive plate. It is therefore possible to freely vary the ratio of the vibration absorbing capacity afforded by the centrifugal pendulum-type vibration absorbing function with respect to the vibration absorbing capacity of the damper as a whole simply by replacing the drive plate holding the centrifugal pendulum-type vibration absorbing device while maintaining at a constant level the primary inertial vibration absorbing function from the inertia force of the damper mass and the function absorbing elastic vibration for damping torsional vibration afforded by torsion spring resilience.

Vibration acting on the damper as a whole and noise produced by the vibration etc. have various frequencies and directionalities including torsional vibration, so it is difficult to absorb only vibration in a specific frequency band, but the damper with an integrated centrifugal pendulum-type vibration absorbing device according to the present invention makes it possible to easily provide a vibration absorbing function which narrows the range to vibration at a specific frequency by freely replacing the centrifugal pendulum-type vibration absorbing body mounted therein and the drive plate including same.

The centrifugal pendulum-type vibration absorbing device has a mass equal to or greater than a certain amount and has a greater vibration restricting effect the larger the diameter of the back plate. Furthermore, the centrifugal pendulum-type vibration absorbing device responds to vibration at a certain specific frequency. Vibration and energy that could not be absorbed by conventional dampers and torsion springs can be absorbed, so the vibration absorbing region of the damper as a whole is especially large and it is also possible to impart selectivity to a given frequency band or to a given vibration.

The damper with an integrated centrifugal pendulum-type vibration absorbing device according to the present invention enables the back plate to which the centrifugal pendulum-type vibration absorbing device is added to be freely removed and attached, and as a result it is also possible to remove only the centrifugal pendulum-type vibration absorbing mechanism. Furthermore, by arranging various back plates with different functions to which the centrifugal pendulum-type vibration absorbing device is added, it is possible to easily provide dampers having different specifications in terms of vibration absorbing function.

The damper with an integrated centrifugal pendulum-type vibration absorbing device according to the present invention makes it possible to vary the ratio of the centrifugal pendulum-type vibration absorbing function with respect to the primary inertial vibration absorbing function and the elastic vibration absorbing function, so it is possible to demonstrate a vibration absorbing function that provides a vibration absorbing function from the damper as a whole that is narrowed to target vibration control with a high absorption effect corresponding to the vibration frequency, direction, type and magnitude etc. It is possible to selectively attach a drive plate having a centrifugal vibration absorbing function commensurate with the frequency of vibration (frequency).

According to the present invention, it is possible to provide a damper with an integrated centrifugal pendulum-type vibration absorbing device which combines both a torsional vibration absorbing function and a centrifugal pendulum-type vibration absorbing function, enabling free setting of a balance between the two functions of elastic vibration absorption and centrifugal pendulum-type vibration absorption.

Furthermore, according to the present invention, it is possible to provide a damper with an integrated centrifugal pendulum-type vibration absorbing device which also offers a particular improvement in terms of economic efficiency while also especially improving the ease of the assembly operation and contributing to reducing the weight of a torque converter as a whole.

DETAILED DESCRIPTION OF THE PREFERRED EMBODIMENT(S)

A mode of embodiment of the present invention will be described below with reference to the figures. It should be noted that the scope required for a description sufficient to achieve the aim of the present invention will be given in simple terms, with the description mainly focusing on the scope required to describe the relevant elements of the present invention, and aspects which are omitted from the description should be considered as known technology.

Figure 1:
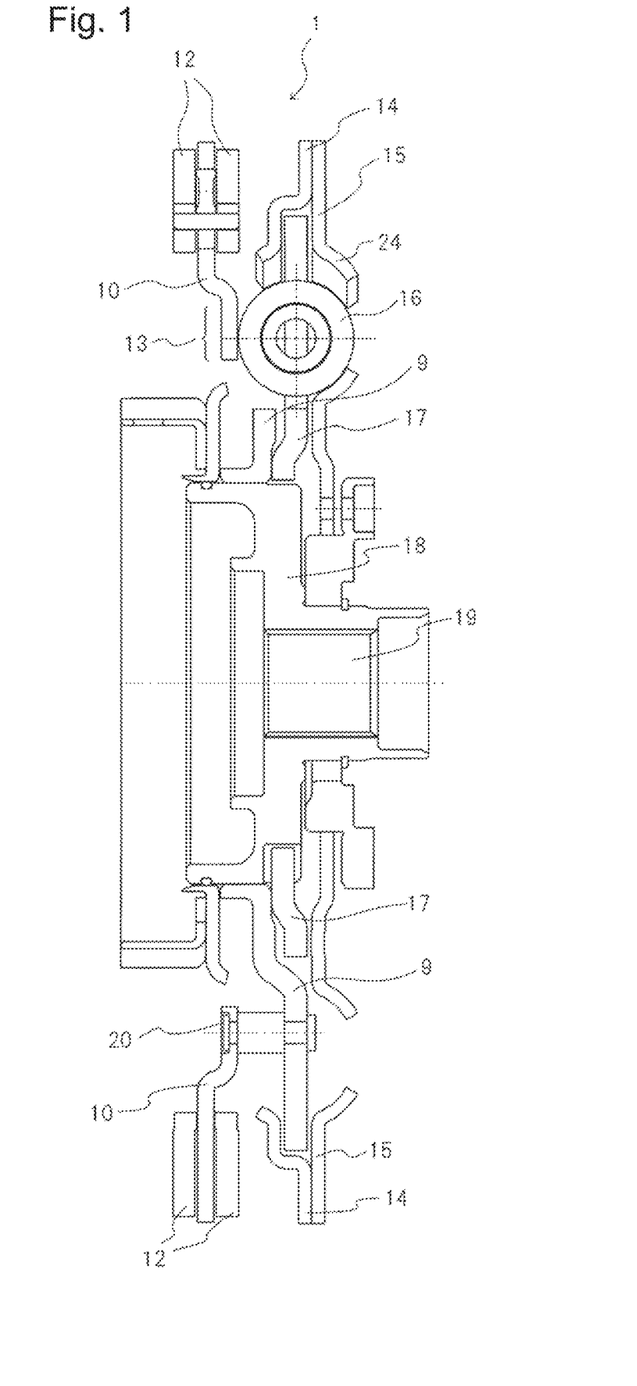
FIG. 1 is a view in cross section showing a damper having a centrifugal pendulum-type vibration absorbing device according to a mode of embodiment of the present invention.
Figure 2:
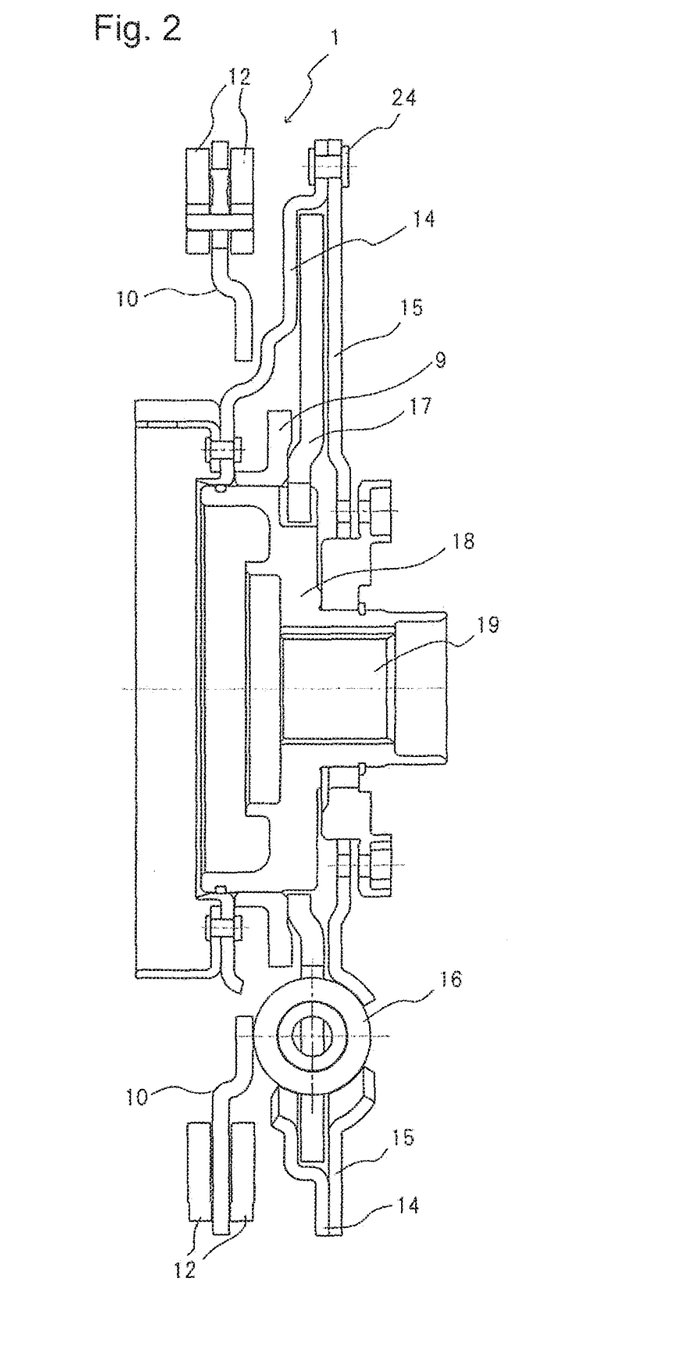
FIG. 2 is a view in cross section showing a damper having a centrifugal pendulum type vibration absorbing device according to a mode of embodiment of the present invention.

Each of FIGS. 1 and 2 is a view in cross section showing a damper having a centrifugal pendulum-type vibration absorbing device according to a mode of embodiment of the present invention. FIGS. 1 and 2 show an arrangement in which a substantially disk-shaped drive plate 14 and a side plate 15 are non-moveably connected by rivets 24 (best shown in FIG. 2) and transmit torque to a clutch hub 17 and a turbine hub 18 by way of torsion springs 16, with an input shaft 19 constituting a torque transmission shaft serving as a center of rotation. A back plate 10 provided with centrifugal pendulum-type vibration absorbing devices 12 on the outside in the radial direction is fixed by rivets 20 from the drive plate 14 side in a state in which side surfaces of the torsion springs 16 are held.

FIG. 2 is a view in cross section showing a damper having a centrifugal pendulum-type vibration absorbing device according to a mode of embodiment of the present invention. FIG. 2 is a view in cross section of the same damper 1 as in FIG. 1, but is a view in cross section from a different angle to that of FIG. 1 that does not pass through the location of the rivets 20.

Figure 3:
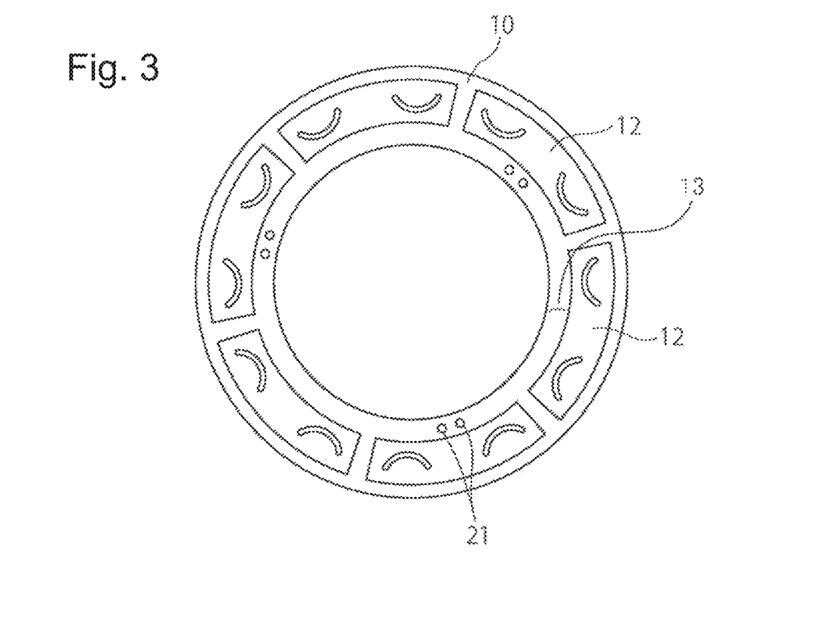
FIG. 3 is an external view showing an image of a back plate in a damper having a centrifugal pendulum-type vibration absorbing device according to a mode of embodiment of the present invention.

FIG. 3 is an external view showing an image of a back plate in a damper having a centrifugal pendulum-type vibration absorbing device according to a mode of embodiment of the present invention. As shown in FIG. 3, the back plate 10 of the damper 1 having a centrifugal pendulum-type vibration absorbing device according to a mode of embodiment of the present invention is provided with six, for example, centrifugal pendulum-type vibration absorbing devices 12 at equal angles on both sides of a radial side surface substantially in the shape of a disk but with fixed regions removed in a substantially circular shape from the center of rotation ("substantially in the shape of a disk but with fixed regions removed in a substantially circular shape from the center of rotation" will be described hereinafter as "substantially doughnut-shaped", or similar). Furthermore, rivet-fixing through-holes 21 in three locations, for example, are provided at equal angular positions on the inside of the radial side surface. The internal structure of the centrifugal pendulum-type vibration absorbing device 12 is known technology and will there bre not be described in detail.

Figure 4:
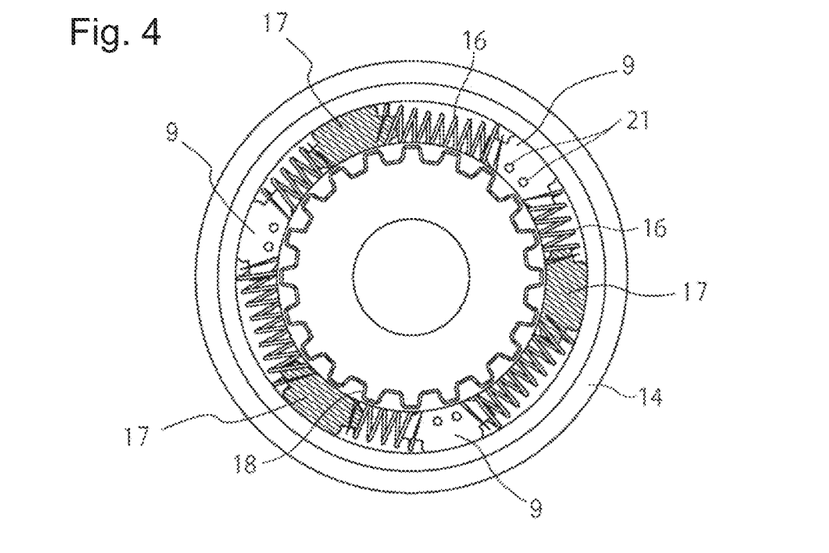
FIG. 4 is an external view from a drive plate side, with the back plate removed, of a damper having a centrifugal pendulum-type vibration absorbing device according to a mode of embodiment of the present invention.

FIG. 4 is an external view seen from the drive plate 14 side, with the back plate 10 removed, of a damper having a centrifugal pendulum-type vibration absorbing device according to a mode of embodiment of the present invention. As shown in FIG. 4, the drive plate 14 has through-holes in substantially doughnut-shaped side surfaces, and six torsion springs 16 are held, for example. In FIG. 4, two types of torsion springs 16, namely large and small, are shown. As best shown in FIG. 2, axially right (or first) sides 161 of the torsion springs 16 are axially held for axially retained) by means of the substantially doughnut-shaped side plate 15, while axially left (or second) sides 162 of the torsion springs 16 are axially held (or axially retained) by means of the drive plate 14. Furthermore, rivet-fixing through-holes 21 are provided on the inside of a substantially doughnut-shaped radial side surface.

Figure 5:
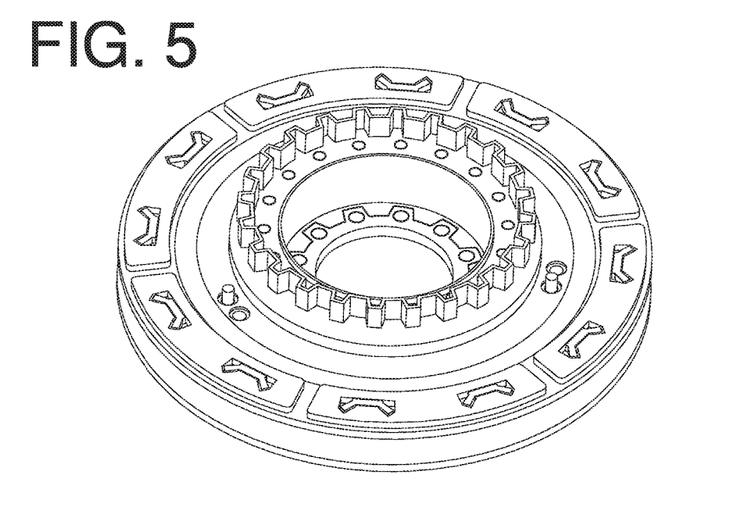
FIG. 5 is a line drawing showing the whole of a damper having a centrifugal pendulum-type vibration absorbing device according to a mode of embodiment of the present invention.

FIG. 5 is a photograph showing the whole of a damper having a centrifugal pendulum-type vibration absorbing device according to a mode of embodiment of the present invention. This is a photograph showing the centrifugal pendulum-type vibration absorbing device according to a mode of embodiment of the present invention from the rotational axis direction. The upper surface constitutes the back plate 10 provided with six centrifugal pendulum-type vibration absorbing devices 12.

Figure 6:
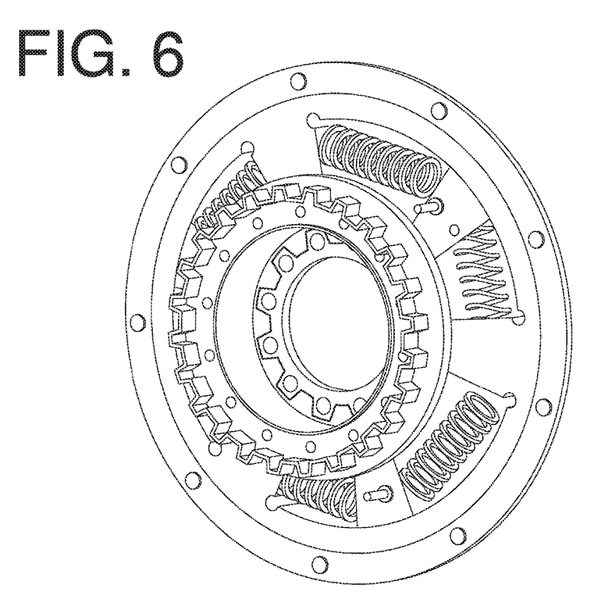
FIG. 6 is a line drawing showing a damper having a centrifugal pendulum-type vibration absorbing device according to a mode of embodiment of the present invention where part of the back plate has been removed.

FIG. 6 is a photograph showing a damper having a centrifugal pendulum-type vibration absorbing device according to a mode of embodiment of the present invention where part of the back plate has been removed. This is an external view photographically showing the exterior of the damper having a centrifugal pendulum-type vibration absorbing device according to the mode of embodiment of the present invention shown in FIG. 4, as seen from the drive plate 14 side with the back plate 10 having been removed.

Figure 7:
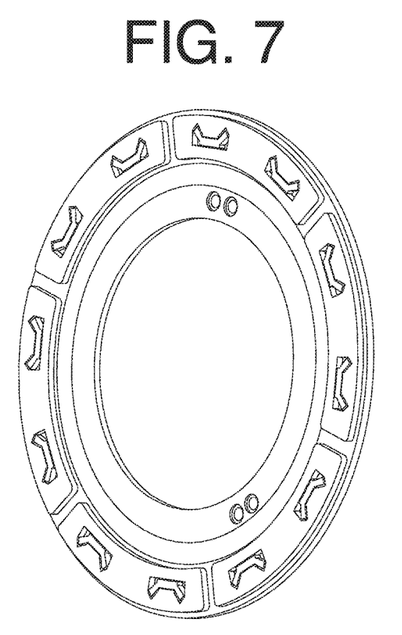
FIG. 7 is a line drawing showing a back plate and a centrifugal pendulum-type vibration absorbing device of a damper having a centrifugal pendulum-type vibration absorbing device according to a mode of embodiment of the present invention.

FIG. 7 is a diagram relating to a photograph showing a back plate and a centrifugal pendulum-type vibration absorbing device of a damper having a centrifugal pendulum-type vibration absorbing device according to a mode of embodiment of the present invention. This is an external view photographically showing the exterior of the back plate of the damper having a centrifugal pendulum-type vibration absorbing device according to the mode of embodiment of the present invention shown in FIG. 3.

As shown in FIG. 1, FIG. 4 and FIG. 6, the abovementioned torsion springs 16 which are interposed between the side plate 15 and drive plate 14 of the damper 1 having a centrifugal pendulum-type vibration absorbing device according to a mode of embodiment of the present invention transmit rotational torque to the clutch hub 17 and transmit torque to the input shaft 19.

As shown in FIG. 4, the torsion springs 16 are alternately disposed at equal intervals and comprise three large springs and three small springs on a radial side surface of the drive plate 14, but there is no limitation to the number or size of the torsion springs 16. They should simply be disposed at equal intervals in terms of distance from the center of the rotational axis or in terms of the angular arrangement thereof.

As shown in FIG. 1, FIG. 3 and FIG. 5, the back plate 10 of the damper having a centrifugal pendulum-type vibration absorbing device according to a mode of embodiment of the present invention is provided with, for example, six centrifugal pendulum-type vibration absorbing devices 12 at equal angles in pairs on both radial side surfaces which are shaped substantially like a doughnut. As shown in FIG. 3, there is no limitation to providing six of the centrifugal pendulum-type vibration absorbing devices 12, nor is there a limitation to the vibration absorbing function defined by the number, size, weight or positioning thereof because the size, weight and positioning etc. thereof may be varied. That is to say, it is possible to select various types of centrifugal pendulum-type vibration absorbing devices 12 according to the specification.

The back plate 10 is fixed to a damper back plate 9 by means of the rivets 20 at the location of the rivet through-holes 21. The centrifugal pendulum-type vibration absorbing devices 12 provided on the back plate 10 have the function of controlling a reduction in the speed of rotation of the damper back plate 9 as it attempts to rotate rapidly, by moving the center of gravity to the outer circumference using the moment of inertia, of the centrifugal pendulums, while simultaneously dispersing rotational energy by absorbing vibration. Said devices likewise also have the function of dampening torsional vibration which cannot be absorbed by the torsion springs 16.

The centrifugal pendulum-type vibration absorbing devices 12 can therefore be provided together with the back plate 10 with various specifications such that the number, weight and arrangement distance from the center can be varied in accordance with the vibration absorbing capacity. The specification of the centrifugal pendulum-type vibration absorbing device which is required for the torque converter overall and for the damper overall should be selected from among these variations.

As shown in FIG. 1, the back plate 10 of the damper having a centrifugal pendulum-type vibration absorbing device according to a mode of embodiment of the present invention comprises a torsion spring holding surface 13 for holding and restraining the circumferential surfaces of the torsion springs 16 disposed on the radial side surface of the adjacent drive plate 14.

Before the back plate 10 is positioned, as shown in FIG. 4, the torsion springs 16 are positioned in the through-holes formed in the drive plate 14 and the side plate 15, and the circumferential surfaces of the torsion springs 16 on the side plate 15 side (the rear surface side in FIG. 4) are fixed by the holding surface of the side plate 15. Both sides of the torsion springs 16, which constitute expanding and contracting surfaces, are supported by the clutch hub 17 and the damper back plate 9.

Here, the back plate side (the upper surface side in FIG. 4) of the torsion springs 16 is conventionally supported by spring-holding protrusions of the drive plate 14. However, both sides of the torsion springs 16, which constitute expanding and contracting surfaces, are subjected to impact from the clutch hub 17 due to expansion or contraction every time torque rotation is generated, and therefore the torsion springs are likely to become removed from the through-holes in the drive plate 14 and the side plate 15, and detached or damaged as a result. The torsion springs 16 are therefore members which are likely to undergo bending deformation so durability is a problem.

In the present application, as shown in FIG. 1, the damper having a centrifugal pendulum-type vibration absorbing device according to a mode of embodiment of the present invention is such that the torsion spring holding surface 13 is provided on the back plate 10 in a circular form in the radial direction so as to restrain and hold, and also to secure, the circumferential surfaces of the torsion springs 16 in such a way that said torsion springs are held from opposite sides of the side plate 15, and the fixing force and durability of the torsion springs 16 is increased as a result, and it is also possible to avoid the risk of buckling, detachment or damage thereto. Furthermore, there is no longer any need to provide a large holding surface for the torsion springs on the drive plate 14 compared with a conventional method of holding that employs a drive plate, and it is possible to provide extra space in the axial direction. This also leads to a reduction in the size and the weight of the drive plate 14 and to a reduction in the weight of the damper overall.

Furthermore, the structure of the damper having a centrifugal pendulum-type vibration absorbing device according to a mode of embodiment of the present invention also makes a large contribution to simplifying assembly. The following procedure is used to assemble the damper: the side plate 15, hub clutch 17, damper back plate 9, and drive plate 14 are assembled in succession in the axial direction, the torsion springs 16 are placed, and finally the back plate 10 is fixed by the rivets 20. That is to say, the structure enables successive assembly by means of an operation in which the members are placed one over another in one direction from the lower member to the upper member, so the assembly operation is optimized and it is very simple to change or replace etc. the members.

During the assembly, the rivets 20 pass through each member, so by securing the rivets 20 in position at the start of assembly, it is possible to very easily and accurately secure the other members in the assembly positions thereof. Simplifying the assembly operation in this way also contributes to facilitating changing or replacement of the members. Replacement and assembly are very simple when the specification of the back plate 10 including the centrifugal pendulum-type vibration absorbing devices 12 is changed.

The damper having a centrifugal pendulum-type vibration absorbing device according to a mode of embodiment of the present invention can contribute in a significant way to reducing weight. As described above, a conventional drive plate requires holding surfaces (a cover portion) for holding the torsion springs 16 from the circumferential surface thereof, so the weight increases in proportion to the surface area of the holding surfaces required along the circumferential surface on which the torsion springs 16 are arranged, hut this is unnecessary in the present invention so a reduction in weight can be envisaged.

Conversely, the function of holding the circumferential surface of the torsion springs 16 is provided by the torsion spring holding surface 13 on the back plate 10 comprising the centrifugal pendulum-type vibration absorbing device 12, so the weight of that portion is borne by the back plate 10. The centrifugal pendulum-type vibration absorbing devices 12 have the basic function of damping and absorbing rotational movement of the system as a whole and vibration thereof, so the weight of the centrifugal pendulum portion and the weight of the back plate as a whole in which the centrifugal pendulum-type vibration absorbing devices 12 are provided play an important role in demonstrating that function. In order for the centrifugal pendulum-type vibration absorbing function to be demonstrated, a certain weight or greater should be maintained and the balance thereof must lie on the outside of the rotational circumference.

The back plate 10 of the damper 1 having a centrifugal pendulum-type vibration absorbing device according to a mode of embodiment of the present invention may therefore have any structure and weight suitable for the required function. In addition, the weight of the back plate 10 having the centrifugal pendulum-type vibration absorbing function may be set at a higher value in relation to the overall weight of the side plate 15, drive plate 14, torsion springs 16 and hub clutch 17, in order to take account of the weight balance of the damper as a whole.

As a result, the centrifugal pendulum-type vibration absorbing function is increased in comparison with the torsional vibration damping and absorbing function afforded by the torsion springs 16. That is to say, the damper having a centrifugal pendulum-type vibration absorbing device according to a mode of embodiment of the present invention not only enables the centrifugal pendulum-type vibration absorbing function to be varied by changing the weight, size and number etc. of the centrifugal pendulum-type vibration absorbing devices 12 and the structure of the back plate 10 such as the size and thickness thereof, it also enables the relative centrifugal pendulum-type vibration absorbing function to be varied with respect to the torsional vibration absorbing function, and to be set simultaneously. In other words, it is possible to preset the relative level of contribution and the degree of participation of the torsional vibration damping and absorbing function and the centrifugal pendulum-type vibration absorbing function, in accordance with the vibration frequency and wavelength to be absorbed by the torque converter as a whole, which is the issue to be addressed. This has a considerable technical significance.

As already described above, the size, weight, number and structure relating to the back plate 10 and the centrifugal pendulum-type vibration absorbing devices 12 in the final assembly process may be set in various ways in accordance with the required centrifugal pendulum-type vibration absorbing function, and it is possible to produce these as members of separate, defined grades, i.e. with set variations, and therefore these grades may be freely selected according to the required function. It goes without saying that this more effectively demonstrates the abovementioned technical significance.

The damper having a centrifugal pendulum-type vibration absorbing device according to a mode of embodiment of the present invention can be considered to be a damper enabling a selection in accordance with the required function and in accordance with the specification of a torque converter, as mentioned above.

Figure 8:
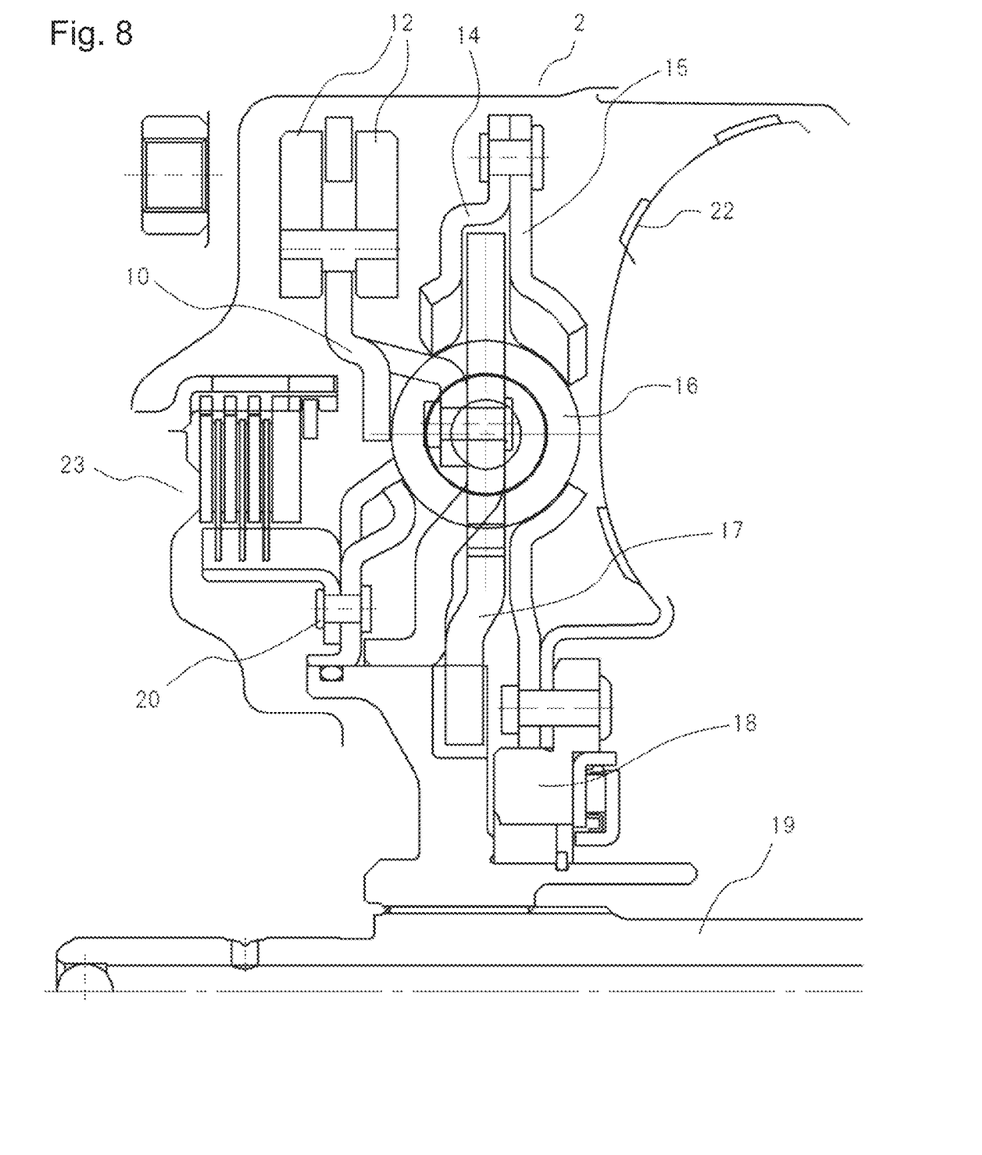
FIG. 8 is a view in cross section schematically showing a lock-up device mounted on a damper having a centrifugal pendulum-type vibration absorbing device according to a mode of embodiment of the present invention.

FIG. 8 is a view in cross section schematically showing a torque converter 2 comprising a turbine 22 and a lock-up device 23 mounted on a damper having a centrifugal pendulum-type vibration absorbing device according to a mode of embodiment of the present invention. FIG. 8 is a half view in cross section of the input shaft 19 constituting a rotary shaft, and shows a damper having a centrifugal pendulum-type vibration absorbing device according to a mode of embodiment of the present invention together with a lock-up device 23 having a piston function and the turbine 22.

As shown in FIG. 8, the damper having a centrifugal pendulum-type vibration absorbing device according to a mode of embodiment of the present invention is applied as an internal structure of a torque converter comprising a lock-up device, and therefore it is possible to reduce the space occupied by members and the weight thereof, the range of the vibration absorption function can be increased, and the options in terms of specification, such as the selection of the vibration frequency to be absorbed can be increased in diverse ways, which is of considerable technical significance. This makes a large contribution to improving the performance and quality of the lock-up device and the torque converter as a whole.

It should be noted that the present invention is not limited to the mode of embodiment described above and various modifications may be made within a scope that does not depart from the main point of the present invention. All such modifications form part of the present technical concept.

As described above, the invention of this application provides a damper having a centrifugal pendulum-type vibration absorbing device enabling a choice of specification to allow vibration absorption over a wide range, and also particularly improves economic efficiency while particularly improving safety of production and assembly, as well as ease of operation. Furthermore, the function of a transmission and a torque converter having the damper according to the present invention is also considerably improved.

The present invention is therefore not limited to a vehicle-mounted torque converter, and may also be utilized in and applied to all types of power transmission applications. The present application therefore exhibits a considerable advantage in various industries involving internal combustion engines and mechanical power transmission, in addition to the automotive industry.

The invention claimed is:
1. A damper, comprising:
a drive plate formed with a stepped shape toward a substantially annular outer edge, for transmitting engine torque to a transmission;
a substantially annular side plate non-moveably connected to an outermost edge portion of the drive plate;
a substantially annular clutch hub held between the side plate and the drive plate;
a plurality of torsion springs interposed between the side plate and the drive plate, the torsion springs elastically coupling the drive and side plates with the clutch hub;
a damper back plate engaging at least one end of the torsion springs, the damper back plate elastically coupled to the drive and side plates and to the clutch hub so that the drive and side plates are elastically coupled to the clutch hub through the damper back plate;
a substantially disk-shaped and substantially annular back plate non-moveably secured to the damper back plate; and
a centrifugal pendulum-type vibration absorbing device mounted on an outer circumferential surface of the back plate;
the back plate secured to the damper back plate so as to be removable from the damper back plate axially in the direction away from the torsion springs and the drive and side plates;

the back plate axially retaining the torsion springs between the drive and side plates.

2. The damper as claimed in claim 1, wherein the centrifugal pendulum-type vibration absorbing device is removable from one side of a power transmission device in the direction of a rotational axis thereof, and wherein the centrifugal pendulum-type vibration absorbing device is fixed by a plurality of rivets at substantially equal angular positions about the rotational axis.

3. The damper as claimed in claim 1, further comprising a turbine hub non-rotatably connected to the clutch hub.

4. A torque converter comprising:
a turbine; and
a damper drivingly connected to the turbine, the damper including
a drive plate formed with a stepped shape toward a substantially annular outer edge for transmitting engine torque to a transmission;
a substantially annular side plate non-moveably connected to an outermost edge portion of the drive plate;
a substantially annular clutch hub held between the side plate and the drive plate;
a plurality of torsion springs interposed between the side plate and the drive plate, the torsion springs elastically coupling the drive and side plates with the clutch hub;
a damper back plate engaging at least one end of the torsion springs, the damper back plate elastically coupled to the drive and side plates and to the clutch hub so that the drive and side plates are elastically coupled to the clutch hub through the damper back plate;
a substantially disk-shaped and substantially annular back plate non-moveably secured to the damper back plate, the back plate secured to the damper back plate so as to be removable from the damper back plate axially in the direction away from the torsion springs and the drive and side plates; and
a centrifugal pendulum-type vibration absorbing device mounted on an outer circumferential surface of the back plate; and
a lock-up device mounted to the drive plate;
the back plate axially retaining the torsion springs between the drive and side plates.

5. The torque converter as claimed in claim 4, wherein the centrifugal pendulum-type vibration absorbing device is removable from one side of a power transmission device in the direction of a rotational axis thereof, and wherein the centrifugal pendulum-type vibration absorbing device is fixed by a plurality of rivets at substantially equiangular positions about the rotational axis.

6. The torque converter as claimed in claim 4, further comprising a turbine hub non-rotatably connected to the clutch hub.

* * * * *